US010358592B2

(12) United States Patent
Rached

(10) Patent No.: US 10,358,592 B2
(45) Date of Patent: Jul. 23, 2019

(54) HEAT TRANSFER METHOD

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/491,717

(22) Filed: Apr. 19, 2017

(65) Prior Publication Data
US 2017/0218242 A1 Aug. 3, 2017

Related U.S. Application Data

(63) Continuation of application No. 15/142,898, filed on Apr. 29, 2016, now Pat. No. 9,683,157, which is a continuation of application No. 13/393,626, filed as application No. PCT/FR2010/051728 on Aug. 18, 2010, now abandoned.

(30) Foreign Application Priority Data

Sep. 11, 2009 (FR) ..................... 09 56246

(51) Int. Cl.
C09K 5/04 (2006.01)
F25B 9/00 (2006.01)
F25B 13/00 (2006.01)
F25B 31/00 (2006.01)

(52) U.S. Cl.
CPC .............. C09K 5/045 (2013.01); F25B 9/006 (2013.01); F25B 13/00 (2013.01); F25B 31/002 (2013.01); C09K 2205/126 (2013.01); C09K 2205/22 (2013.01)

(58) Field of Classification Search
CPC ................ C09K 5/045; C09K 2205/22; C09K 2205/126
See application file for complete search history.

(56) References Cited

U.S. PATENT DOCUMENTS

| 6,503,417 | B1 | 1/2003 | Bivens |
| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,808,569 | B2 | 8/2014 | Rached |
| 8,858,824 | B2 | 10/2014 | Boussand |
| 8,858,825 | B2 | 10/2014 | Guerin et al. |
| 9,011,711 | B2 | 4/2015 | Rached |
| 9,028,706 | B2 | 5/2015 | Rached et al. |
| 9,039,922 | B2 | 5/2015 | Rached |
| 9,127,191 | B2 | 9/2015 | Rached |
| 9,133,379 | B2 | 9/2015 | Rached |
| 9,175,203 | B2 | 11/2015 | Rached |
| 9,267,064 | B2 | 2/2016 | Rached |
| 9,315,708 | B2 | 4/2016 | Guerin et al. |
| 9,399,726 | B2 | 7/2016 | Rached |
| 9,505,968 | B2 | 11/2016 | Rached |
| 9,512,343 | B2 | 12/2016 | Rached et al. |
| 9,599,381 | B2 | 3/2017 | Rached |
| 9,650,551 | B2 | 5/2017 | Collier et al. |
| 9,650,553 | B2 | 5/2017 | Deur-Bert et al. |
| 9,663,697 | B2 | 5/2017 | Rached |
| 9,676,984 | B2 | 6/2017 | Guerin et al. |
| 9,683,155 | B2 | 6/2017 | Deur-Bert et al. |
| 9,683,157 | B2 | 6/2017 | Rached |
| 9,884,984 | B2 | 2/2018 | Rached |
| 9,908,828 | B2 | 3/2018 | Rached et al. |
| 9,969,918 | B2 | 5/2018 | Deur-Bert et al. |
| 10,023,780 | B2 | 7/2018 | Guerin et al. |
| 10,035,938 | B2 * | 7/2018 | Rached .................. C09K 5/045 |
| 10,119,055 | B2 | 11/2018 | Boussand |
| 10,125,296 | B2 | 11/2018 | Rached |
| 2006/0243944 | A1 | 11/2006 | Minor et al. |
| 2008/0184731 | A1 | 8/2008 | Sienel et al. |
| 2008/0314073 | A1 | 12/2008 | Minor |
| 2011/0084228 | A1 | 4/2011 | Rached |
| 2011/0095224 | A1 | 4/2011 | Rached |

(Continued)

FOREIGN PATENT DOCUMENTS

EP 2 149 592 A2 2/2010
EP 2 246 649 A1 11/2010

(Continued)

OTHER PUBLICATIONS

International Search Report issued in PCT/FR2010/051728, dated Feb. 11, 2011, 4 pages, European Patent Office, Rijswijk, NL (English/French language versions).
Hwang Y. "Vapor Compression Heat Pumps with Refrigerant Mixtures" CRC Press, Taylor & Francis Group, 2005, 4 pages.
Notification of Opposition issued by the European Patent Office on Mar. 1, 2017 in European Patent Application EP 10762992.5-1375/2475737, (Arkema France), (24 pages).
Rached, Wissam, U.S. Appl. No. 15/396,855 entitled "Heat Transfer Fluid," filed in the U.S. Patent and Trademark Office on Jan. 3, 2017.
U.S. Appl. No. 13/128,996, Wissam Rached, filed May 12, 2011 (Cited herein as US Patent Application Publication No. 2011/0219791 A1 of Sep. 15, 2011).

(Continued)

Primary Examiner — John R Hardee
(74) Attorney, Agent, or Firm — Buchanan Ingersoll & Rooney P.C.

(57) ABSTRACT

A heat transfer method using ternary compositions containing 2,3,3,3-tetrafluoropropene, 1,1-difluoroethane and difluoromethane, said compositions being especially interesting as a heat transfer fluid in compression refrigeration systems comprising exchangers operation in counterflow mode or in split flow mode with counterflow tendency. The use of a ternary composition of 2,3,3,3-tetrafluoropropene, 1,1-difluoroethane and difluoromethane as heat transfer fluid in compression-type refrigeration systems with exchangers operating in countercurrent mode or in crossed-current mode with countercurrent tendency.

9 Claims, No Drawings

(56) References Cited

U.S. PATENT DOCUMENTS

| | | |
|---|---|---|
| 2011/0186772 A1 | 8/2011 | Rached |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0068105 A1 | 3/2012 | Rached et al. |
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2013/0092869 A1 | 4/2013 | Boussand |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1 | 11/2015 | Collier et al. |
| 2015/0344761 A1 | 12/2015 | Rached |
| 2015/0353802 A1 | 12/2015 | Rached |
| 2016/0009555 A1 | 1/2016 | Bonnet et al. |
| 2016/0115361 A1 | 4/2016 | Boussand |
| 2016/0122609 A1 | 5/2016 | Rached |
| 2016/0244652 A1 | 8/2016 | Rached |
| 2016/0272561 A1 | 9/2016 | Rached et al. |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2018/0086173 A1 | 3/2018 | Rached |
| 2018/0134936 A1 | 5/2018 | Rached |
| 2018/0148395 A1 | 5/2018 | Rached et al. |
| 2018/0244970 A1 | 8/2018 | Rached |
| 2018/0282603 A1 | 10/2018 | Guerin |

FOREIGN PATENT DOCUMENTS

| | | |
|---|---|---|
| FR | 2182956 | 12/1973 |
| FR | 2256381 A | 7/1975 |
| FR | 2 936 806 | 4/2010 |
| FR | 2 936 807 | 4/2010 |
| JP | 4110388 | 4/1992 |
| JP | 2008-134031 A | 6/2008 |
| JP | 2008-531836 A | 8/2008 |
| JP | 2009-222362 A | 10/2009 |
| JP | 2009-228984 A | 10/2009 |
| JP | 2009-257601 A | 11/2009 |
| JP | 2009-257655 A | 11/2009 |
| JP | 2010-002074 A | 1/2010 |
| JP | 2010-047754 A | 3/2010 |
| RU | 2 189 544 C2 | 9/2002 |
| WO | WO 2004/037913 A2 | 5/2004 |
| WO | WO 2004/037913 A3 | 5/2004 |
| WO | WO 2005/105947 A2 | 11/2005 |
| WO | WO 2006/094303 A2 | 9/2006 |
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | WO 2008/009922 A2 | 1/2008 |
| WO | WO 2008/027555 A2 | 3/2008 |
| WO | WO 2008/027555 A3 | 3/2008 |
| WO | WO 2008/085314 A2 | 7/2008 |
| WO | WO 2008/140809 A2 | 11/2008 |
| WO | WO 2009/107364 A1 | 9/2009 |
| WO | WO 2009/110228 A1 | 9/2009 |
| WO | WO 2010/000994 A2 | 1/2010 |
| WO | WO 2010/000994 A3 | 1/2010 |
| WO | WO 2010/040928 A1 | 4/2010 |
| WO | WO 2010/059677 A2 | 5/2010 |
| WO | WO 2010/059677 A3 | 5/2010 |
| WO | WO 2011/030029 A1 | 3/2011 |
| WO | WO 2011/141654 A2 | 11/2011 |
| WO | WO 2011/141654 A3 | 11/2011 |

OTHER PUBLICATIONS

U.S. Appl. No. 13/129,240, Wissam Rached, filed May 13, 2011 (Cited herein as US Patent Application Publication No. 2011/0219792 A1 of Sep. 15, 2011).

U.S. Appl. No. 13/146,721, Wissam Rached, filed Jul. 28, 2011 (Cited herein as US Patent Application Publication No. 2011/0284181 A1 of Nov. 24, 2011).

U.S. Appl. No. 13/808,326, Béatrice Boussand, filed Jan. 4, 2013 (Cited herein as US Patent Application Publication No. 2013/0105724 A1 of May 2, 2013).

U.S. Appl. No. 14/371,118, Béatrice Boussand, filed Jul. 8. 2014 (Cited herein as US Patent Application Publication No. 2015/0027146 A1 of Jan. 29, 2015).

U.S. Appl. No. 14/615,780, Wissam Rached, filed Feb. 6, 2015 (Cited herein as US Patent Application Publication No. 2015/0152307 A1 of Jun. 4, 2015).

U.S. Appl. No. 14/830,130, Wissam Rached, filed Aug. 19, 2015 (Cited herein as US Patent Application Publication No. 2015/0353802 a1 of Dec. 10, 2015).

U.S. Appl. No. 14/772,950, Phillippe Bonnet, filed Sep. 4, 2015 (Cited herein as US Patent Application Publication No. 2016/0009555 A1 of Jan. 14, 2016).

U.S. Appl. No. 14/990,159, Béatrice Boussand, filed Jan. 7, 2016 (Cited herein as US Patent Application Publication No. 2016/0115361 A1 of Apr. 28, 2016).

U.S. Appl. No. 14/992,387, Wissam Rached, filed Jan. 11, 2016 (Cited herein as US Patent Application Publication No. 2016/0122609 A1 of May 5, 2016).

U.S. Appl. No. 15/073,108, Wissam Rached, filed Mar. 17, 2016 (Cited herein as US Patent Application Publication No. 2016/0272561 A1 of Sep. 22, 2016).

U.S. Appl. No. 15/238,883, Wissam Rached, filed Aug. 17, 2016 (Cited herein as US Patent Application Publication No. 2016/0355718 A1 of Dec. 8, 2016).

U.S. Appl. No. 14/903,461, Sophie Guerin, filed Jan. 7, 2016 (Cited herein as US Patent Application Publication No. 2016/0376484 A1 of Dec. 29, 2016).

U.S. Appl. No. 15/297,569, Wissam Rached, filed Oct. 19, 2016 (Cited herein as US Patent Application Publication No. 2017/0037291 A1 of Feb. 9, 2017).

U.S. Appl. No. 15/368,347, Wissam Rached, filed Dec. 2, 2016 (Cited herein as US Patent Application Publication No. 2017/0080773 A1 of Mar. 23, 2017).

U.S. Appl. No. 15/481,815, Bertrand Collier, filed Apr. 7, 2017 (Cited herein as US Patent Application Publication No. 2017/0210962 A1 of Jul. 27, 2017).

U.S. Appl. No. 15/481,873, Dominique Duer-Bert, filed Apr. 7, 2017 (Cited herein as US Patent Application Publication No. 2017/0210960 A1 of Jul. 27, 2017).

U.S. Appl. No. 15/490,541, Dominique Deur-Bert, filed Apr. 18, 2017 (Cited herein as US Patent Application Publication No. 2017/0218241 A1 of Aug. 3, 2017).

Bigot, G., et al., "Optimized Design of Heat Exchangers for "Reversible" Heat Pump Using R-407C," Paper 463, *Eighth International Refrigeration and Air Conditioning Conference at Purdue University, West Lafayette, IN, USA*, Jul. 25-28, 2000, pp. 38-46, Purdue University, Purdue e-Pubs, http://docs.lib.purdue.edu/iracc/463.

(56) References Cited

OTHER PUBLICATIONS

Liu, X., "Efficiency of Non-Azeotropic Refrigerant Cycle," *International Refrigeration and Air Conditioning Conference*, Paper 396, 1998, pp. 108-114, Purdue University, Purdue e-Pubs, http://docs.lib.purdue.edu/iracc/396.

Minor, Barbara Haviland, et al., U.S. Appl. No. 61/116,029, filed Nov. 19, 2008, 60 pages, including cover page (citation O1a).

Minor, Barbara Haviland, et al., U.S. Appl. No. 61/180,201, filed May 21, 2009, 63 pages, including cover page (citation O1b).

Rached, Wissam, U.S. Appl. No. 15/809,164 entitled "Vehicle Heating and/or Air Conditioning Method," filed in the U.S. Patent and Trademark Office on Nov. 10, 2017.

Rached, Wissam, U.S. Appl. No. 15/820,996 entitled "Method for Heating and/or Air Conditioning a Vehicle," filed in the U.S. Patent and Trademark Office on Nov. 22, 2017.

Rached, Wissam, U.S. Appl. No. 15/856,703 entitled "Binary Refrigerating Fluid," filed in the U.S. Patent and Trademark Office on Dec. 28, 2017.

Rached, Wissam, et al., U.S. Appl. No. 15/878,794 entitled "Stabilization of 1-Chloro-3,3,3-Trifluoropropene," filed in the U.S. Patent and Trademark Office on Jan. 24, 2018.

Boussand, Beatrice, U.S. Appl. No. 16/034,539 entitled "Stable 2,3,3,3-Tetrafluoropropene Composition," filed in the U.S. Patent and Trademark Office on Jul. 13, 2018.

Rached, Wissam, U.S. Appl. No. 16/142,492 entitled "Heat Transfer Fluid," filed in the U.S. Patent and Trademark Office on Sep. 26, 2018.

Rached, Wissam, U.S. Appl. No. 16/143,518 entitled "Binary Refrigerating Fluid," filed in the U.S. Patent and Trademark Office on Sep. 27, 2018.

\* cited by examiner

HEAT TRANSFER METHOD

CROSS REFERENCE TO RELATED APPLICATIONS

The present application is a continuation of U.S. application Ser. No. 15/142,898, filed on Apr. 29, 2016, which is a continuation of U.S. application Ser. No. 13/393,626, filed on Mar. 1, 2012, which is U.S. national stage application of International Application No. PCT/FR2010/051728, filed on Aug. 18, 2010, which claims the benefit of French Application No. 09.56246, filed on Sep. 11, 2009. The entire contents of each of U.S. application Ser. No. 15/142,898, U.S. application Ser. No. 13/393,626, International Application No. PCT/FR2010/051728, and French Application No. 09.56246 are hereby incorporated herein by reference in their entirety.

TECHNICAL FIELD

The present invention relates to the use of ternary compositions of 2,3,3,3-tetrafluoropropene as heat transfer fluids.

BACKGROUND

The problems posed by substances with ozone depletion potential (ODP) were discussed in Montreal, where the protocol was signed requiring a reduction of the production and use of chlorofluorocarbons (CFCs). Amendments were made to this protocol, which imposed abandonment of CFCs, and extended the regulations to cover other products, including hydrochloro-fluorocarbons (HCFCs).

The refrigeration and air conditioning industry has made a considerable investment in the replacement of these refrigerants, which is what led to the marketing of hydrofluorocarbons (HFCs).

The (hydro)chlorofluorocarbons used as expanding agents or solvents have also been replaced with HFCs.

In the automobile industry, the systems for air conditioning of vehicles marketed in many countries have changed over from a chlorofluorocarbon refrigerant (CFC-12) to a hydrofluorocarbon refrigerant (1,1,1,2-tetrafluoroethane: HFC-134a), which is less harmful to the ozone layer. However, with regard to the objectives established by the Kyoto protocol, HFC-134a (GWP=1300) is considered to have a high warming power. A fluid's contribution to the greenhouse effect is quantified by a criterion, GWP (Global Warming Potential), which summarizes the warming power, taking a reference value of 1 for carbon dioxide.

Carbon dioxide, being nontoxic, nonflammable and having a very low GWP, has been proposed as refrigerant for air conditioning systems, replacing HFC-134a. However, the use of carbon dioxide has several drawbacks, notably connected with the very high pressure for application as refrigerant in the existing equipment and technologies.

Moreover, the mixture R-404A consisting of 44 wt. % of pentafluoroethane, 52 wt. % of trifluoroethane and 4 wt. % of HFC-134a is widely used as fluid for refrigeration of large areas (supermarkets) and in refrigerated transport. However, this mixture has a GWP of 3900. The mixture R-407C, consisting of 52 wt. % of HFC-134a, 25 wt. % of pentafluoroethane and 23 wt. % of difluoromethane, is used as heat transfer fluid in air conditioning and heat pumps. However, this mixture has a GWP of 1800.

Document JP 4110388 describes the use of hydrofluoropropenes of formula $C_3H_mF_n$, with m, n representing an integer between 1 and 5 inclusive and m+n=6, as heat transfer fluids, in particular tetrafluoropropene and trifluoropropene.

Document WO2004/037913 discloses the use of compositions comprising at least one fluoroalkene having three or four carbon atoms, notably pentafluoropropene and tetrafluoropropene, preferably having a GWP of at most 150, as heat transfer fluids.

Document WO 2005/105947 teaches the addition to tetrafluoropropene, preferably 1,3,3,3-tetrafluoropropene, of a co-blowing agent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses an azeotropic composition containing 7.4 wt. % of 2,3,3,3-tetrafluoropropene (1234yf) and 92.6 wt. % of difluoromethane (HFC-32). This document also discloses an azeotropic composition containing 91 wt. % of 2,3,3,3-tetrafluoropropene and 9 wt. % of difluoroethane (HFC-152a).

A heat exchanger is a device enabling thermal energy to be transferred from one fluid to another, without mixing them. The thermal flux passes through the exchange surface that separates the fluids. This method is most often used for cooling or heating a liquid or a gas that it is impossible to cool or heat directly.

In compression systems, heat exchange between the refrigerant and the heat sources is effected via heat-transfer fluids. These heat-transfer fluids are in the gaseous state (the air in air conditioning and direct-expansion refrigeration), liquid (the water in domestic heat pumps, glycol solution) or two-phase.

There are various transfer modes:
- the two fluids are arranged in parallel and go in the same sense: co-current mode (antimethodical);
- the two fluids are arranged in parallel but go in the opposite sense: countercurrent mode (methodical);
- the two fluids are positioned perpendicularly: crossed-current mode. Crossed-current can have a co-current or countercurrent tendency;
- one of the two fluids makes a U-turn in a wider pipeline, which the second fluid passes through. This configuration is comparable to a co-current exchanger over half its length, and to a countercurrent exchanger for the other half: pin-head mode.

DETAILED DESCRIPTION

The applicant has now discovered that ternary compositions of 2,3,3,3-tetrafluoropropene, 1,1-difluoroethane and difluoromethane are particularly interesting as heat transfer fluid in compression-type refrigeration systems with exchangers operating in countercurrent mode or in crossed-current mode with countercurrent tendency.

Thus, these compositions can be used as heat transfer fluid in heat pumps, optionally reversible, in air conditioning, industrial air conditioning (paper, rooms for servers), in mobile domestic air conditioning, in domestic refrigeration and freezing, in low- and medium-temperature refrigeration and refrigeration of refrigerated vehicles employing compression systems with exchangers in countercurrent mode or in crossed-current mode with countercurrent tendency.

These compositions have both a zero ODP and a GWP below that of existing heat transfer fluids such as R-404A or R-407C. Moreover, their performance (COP: coefficient of performance, defined as the useful power delivered by the system over the power input or consumption of the system; and CAP: volumetric capacity ($kJ/m^3$)) are greater than those of existing heat transfer fluids such as R-404A or R-407C.

The compositions used as heat transfer fluid in the present invention have a critical temperature above 93° C. (the critical temperature of R-404A is 72° C.). These compositions can be used in heat pumps to supply heat at temperatures up to 65° C. but also at higher temperatures up to 90° C. (temperature range where R-404A cannot be used).

The compositions used as heat transfer fluid in the present invention have pressures at the condenser lower than the pressures of R-404A as well as lower compression ratios. These compositions can use the same compressor technology used by R-404A. The compositions used as heat transfer fluid in the present invention have saturated vapor densities less than the saturated vapor density of R-404A. The volumetric capacities given by these compositions are equivalent to or greater than the volumetric capacity of R404A (between 97 and 110%). Owing to these properties, these compositions operate with smaller pipeline diameters and therefore less head loss in the vapor pipelines, which increases the performance of the installations.

The present invention therefore relates to the use of ternary compositions of 2,3,3,3-tetrafluoropropene, 1,1-difluoroethane and difluoromethane that are particularly interesting as heat transfer fluid in compression-type refrigeration systems with exchangers operating in countercurrent mode or in crossed-current mode with countercurrent tendency.

Preferably, the compositions used in the present invention contain essentially from 20 to 80 wt. % of 2,3,3,3-tetrafluoropropene and from 15 to 40 wt. % of difluoromethane and from 5 to 40 wt. % of 1,1-difluoroethane.

Advantageously, the compositions used contain essentially from 20 to 70 wt. % of 2,3,3,3-tetrafluoropropene and from 20 to 40 wt. % of difluoromethane and from 10 to 40 wt. % of difluoroethane.

The compositions that are particularly preferred contain essentially from 35 to 70 wt. % of 2,3,3,3-tetrafluoropropene from 20 to 25 wt. % of difluoromethane and from 10 to 40 wt. % of 1,1-difluoroethane.

The compositions used in the present invention can be stabilized. The stabilizer represents at most 5 wt. % relative to the total composition.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl optionally fluorinated or perfluorinated or alkenyl or aromatic epoxides) such as n-butyl glycidyl ether, hexanediol diglycidyl ether, allyl glycidyl ether, butylphenylglycidyl ether, phosphites, phosphates, phosphonates, thiols and lactones.

Another object of the present invention relates to a method of heat transfer in which ternary compositions of 2,3,3,3-tetrafluoropropene, 1,1-difluoroethane and difluoromethane are used, which are particularly interesting as heat transfer fluid in compression-type refrigeration systems with exchangers operating in countercurrent mode or in crossed-current mode with countercurrent tendency.

The method according to the present invention can be employed in the presence of lubricants such as mineral oil, alkylbenzene, polyalkylene glycol and polyvinyl ether.

The compositions used in the present invention are suitable for replacing R-404A in refrigeration and/or R-407C in air conditioning and heat pumps in existing installations.

EXPERIMENTAL SECTION

Tools for Calculation

The RK-Soave equation is used for calculating the densities, enthalpies, entropies and data for liquid-vapor equilibrium of the mixtures. To use this equation it is necessary to know the properties of the pure substances used in the mixtures in question as well as the coefficients of interaction for each binary mixture.

The data required for each pure substance are:
boiling point, critical temperature and pressure, curve of pressure as a function of temperature from the boiling point up to the critical point, saturated liquid density and saturated vapor density as a function of temperature.
HFC-32, HFC-152a:

The data for these products are published in ASHRAE Handbook 2005 chapter 20, and are also available using Refrop (software developed by NIST for calculating the properties of refrigerants).
HFO-1234yf:

The data for the temperature-pressure curve of HFO-1234yf are measured by the static method. The critical temperature and pressure are measured with a C80 calorimeter marketed by Setaram. The densities at saturation as a function of temperature are measured by the technology of the vibrating-tube densimeter developed by the laboratories of the Ecole des Mines de Paris.
Coefficient of Interaction of the Binary Mixtures The RK-Soave equation uses coefficients of binary interaction for representing the behavior of the products in mixtures. The coefficients are calculated as a function of experimental data for liquid-vapor equilibrium.

The technique used for the measurements of liquid-vapor equilibrium is the static analytical cell method. The equilibrium cell comprises a sapphire tube and is equipped with two ROLSI™ electromagnetic samplers. It is immersed in a cryothermostat bath (HUBER HS40). Magnetic stirring driven by a field rotating at variable speed is used to accelerate the attainment of equilibrium. The samples are analyzed by gas chromatography (HP5890 series II) using a catharometer (TCD).
HFC-32/HFO-1234yf, HFC-152a/HFO-1234yf:

The measurements of liquid-vapor equilibrium on the HFC-32/HFO-1234yf binary mixture are performed for the following isotherms: −10° C., 30° C. and 70° C.

The measurements of liquid-vapor equilibrium on the HFC-152a/HFO-1234yf binary mixture are performed for the following isotherms: 10° C.
HFC-32/HFC-152a: The data for liquid-vapor equilibrium for the HFC-152a/HFC-32 binary mixture are available using Refprop. Two isotherms (−20° C. and 20° C.) and two isobars (1 bar and 25 bar) are used for calculating the coefficients of interaction for this binary mixture.
Compression System Consider a compression system equipped with an evaporator and countercurrent condenser, a screw compressor and a pressure reducing valve.

The system operates with 15° C. of superheating and 5° C. of supercooling. The minimum temperature difference between secondary fluid and the refrigerant is considered to be of the order of 5° C.

The isentropic efficiency of the compressors is a function of the compression ratio. This efficiency is calculated from the following equation:

$$\eta_{isen} = a - b(\tau - c)^2 - \frac{d}{\tau - e} \quad (1)$$

For a screw compressor, constants a, b, c, d and e in equation (1) of isentropic efficiency are calculated using the standard data published in the Handbook "Handbook of air conditioning and refrigeration, page 11.52". The % CAP is the percentage of the ratio of the volumetric capacity supplied by each product to the capacity of R-404A.

The coefficient of performance (COP) is defined as the useful power delivered by the system over the power input or consumption of the system.

The Lorenz coefficient of performance (COPLorenz) is a reference coefficient of performance. It is a function of temperature and is used for comparing the COPs of different fluids.

The Lorenz coefficient of performance is defined as follows:
(The temperatures T are in K)

$$T_{mean}^{condenser} = T_{inlet}^{condenser} - T_{outlet}^{condenser} \quad (2)$$

$$T_{mean}^{evaporator} = T_{outlet}^{evaporator} - T_{inlet}^{evaporator} \quad (3)$$

The Lorenz COP in the case of air conditioning and refrigeration is:

$$COPlorenz = \frac{T_{mean}^{evaporator}}{T_{mean}^{condenser} - T_{mean}^{evaporator}} \quad (4)$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

% COP/COPLorenz is the ratio of the COP of the system to the COP of the corresponding Lorenz cycle.

Results in Heating Mode

In heating mode, the compression system operates between an inlet temperature of the refrigerant at the evaporator of −5° C. and an inlet temperature of the refrigerant at the condenser of 50° C. The system supplies heat at 45° C.

The performance of the compositions according to the invention in the operating conditions in heating mode are given in Table 1. The values of the constituents (HFO-1234yf, HFC-32, HFC-152a) for each composition are given as percentage by weight.

TABLE 1

| HFO-1234yf | HFC-32 | HFC-152a | Temp outlet evap (° C.) | Temp outlet comp (° C.) | T outlet cond (° C.) | evap P (bar) | cond P (bar) | Ratio (w/w) | Shift | efficiency comp | % CAP | % COP/COPLorenz |
|---|---|---|---|---|---|---|---|---|---|---|---|---|
| R404A | | | −5 | 77 | 50 | 5.2 | 23.0 | 4.4 | 0.38 | 79.7 | 100 | 57.7 |
| 70 | 20 | 10 | 0 | 81 | 43 | 4.2 | 17.3 | 4.1 | 4.86 | 80.7 | 97 | 65.8 |
| 60 | 25 | 15 | 0 | 85 | 43 | 4.4 | 18.1 | 4.1 | 5.02 | 80.7 | 104 | 65.9 |
| 50 | 25 | 25 | 0 | 88 | 43 | 4.2 | 17.7 | 4.2 | 4.98 | 80.4 | 102 | 66.6 |
| 35 | 25 | 40 | 0 | 92 | 43 | 3.9 | 16.9 | 4.3 | 5.18 | 80.1 | 100 | 67.6 |

Results for Cooling Mode or Air Conditioning

In cooling mode, the compression system operates between an inlet temperature of the refrigerant at the evaporator of −5° C. and an inlet temperature of the refrigerant at the condenser of 50° C. The system supplies cold at 0° C.

The performance of the compositions according to the invention in the operating conditions in cooling mode is shown in Table 2. The values of the constituents (HFO-1234yf, HFC-32, HFC-152a) for each composition are given as percentage by weight.

TABLE 2

| HFO-1234yf | HFC-32 | HFC-152a | Temp outlet evap (° C.) | Temp outlet comp (° C.) | T outlet cond (° C.) | evap P (BAR) | cond P (bar) | Ratio (w/w) | Shift | efficiency comp | % CAP | % COP/COPLorenz |
|---|---|---|---|---|---|---|---|---|---|---|---|---|
| R404A | | | −5 | 77 | 50 | 5.2 | 23.0 | 4.4 | 0.38 | 79.7 | 100 | 47.9 |
| 70 | 20 | 10 | 0 | 81 | 43 | 4.2 | 17.3 | 4.1 | 4.86 | 80.7 | 105 | 57.8 |
| 65 | 20 | 15 | 0 | 82 | 43 | 4.1 | 17.1 | 4.2 | 4.68 | 80.6 | 104 | 58.3 |
| 60 | 25 | 15 | 0 | 85 | 43 | 4.4 | 18.1 | 4.1 | 5.02 | 80.7 | 113 | 58.2 |
| 55 | 20 | 25 | 0 | 85 | 43 | 3.9 | 16.7 | 4.2 | 4.52 | 80.3 | 104 | 59.0 |
| 50 | 25 | 25 | 0 | 88 | 43 | 4.2 | 17.7 | 4.2 | 4.98 | 80.4 | 112 | 59.2 |
| 40 | 20 | 40 | 0 | 89 | 43 | 3.7 | 16.1 | 4.4 | 4.58 | 80.0 | 103 | 60.3 |
| 35 | 25 | 40 | 0 | 92 | 43 | 3.9 | 16.9 | 4.3 | 5.18 | 80.1 | 110 | 60.5 |

The invention claimed is:

1. A compression-type refrigeration system comprising a heat exchanger operating in countercurrent mode or in crossed-current mode with countercurrent tendency and a heat transfer fluid comprising a refrigerant consisting of a ternary composition of 45 to 80 wt. % 2,3,3,3-tetrafluoropropene, 5 to 35 wt. % 1,1-difluoroethane and 15 to 20 wt. % difluoromethane.

2. The system as claimed in claim 1, wherein the ternary composition consists of 45 to 70 wt. % of 2,3,3,3-tetrafluoropropene, from 15-20 wt. % of difluoromethane, and from 10-35 wt. % of difluoroethane.

3. The system as claimed in claim 1, wherein the ternary composition consists of 70 to 80 wt. % of 2,3,3,3-tetrafluoropropene, from 15-20 wt. % of difluoromethane, and from 5-10 wt. % of difluoroethane.

4. The system as claimed in claim 1, wherein the ternary composition consists of 60 to 80 wt. % of 2,3,3,3-tetrafluoropropene, from 15-20 wt. % of difluoromethane and from 5 to 20 wt. % of difluoroethane.

5. The system as claimed in claim 1, wherein the heat transfer fluid is stabilized with at least one stabilizer.

6. The system as claimed in claim 1, wherein the heat transfer fluid comprises at least one stabilizer selected from the group consisting of nitromethane, ascorbic acid, terephthalic acid, azoles, phenolic compounds, hydroquinone, t-butyl hydroquinone, 2,6-di-tert-butyl-4-methylphenol, epoxides, hexanediol diglycidyl ether, allyl glycidyl ether, butylphenylglycidyl ether, phosphites, phosphates, phosphonates, thiols and lactones.

7. The system as claimed in claim 1, wherein the heat transfer fluid comprises at least one lubricant selected from the group consisting of mineral oil, alkylbenzene, polyalkylene glycol and polyvinyl ether.

8. A compression-type refrigeration system comprising a heat exchanger operating in countercurrent mode or in crossed-current mode with countercurrent tendency and a heat transfer fluid comprising a refrigerant consisting of a ternary composition of 60 to 80 wt. % of 2,3,3,3-tetrafluoropropene, from 5-20 wt. % of difluoromethane, and from 5-20 wt. % of difluoroethane.

9. The system as claimed in claim 8, wherein the ternary composition consists of 60 to 80 wt. % of 2,3,3,3-tetrafluoropropene, from 10 to 20 wt. % of difluoromethane and from 5-15 wt. % of difluoroethane.

* * * * *